United States Patent [19]
Ohkouchi et al.

[11] Patent Number: 5,353,139
[45] Date of Patent: Oct. 4, 1994

[54] SPATIAL LIGHT MODULATOR WITH PHOTOCONDUCTOR OF HYDROGENATED AMORPHOUS SILICON WITH 0.1–1.0 PPM BORON

[75] Inventors: Nozomu Ohkouchi; Hiromitsu Takenaka; Tadayuki Shimada, all of Yokosuka; Shigeo Shimizu, Yokohama;Toshio Konno, Tokyo, all of Japan

[73] Assignee: Victor Company of Japan, Ltd., Yokohama, Japan

[21] Appl. No.: 977,613

[22] Filed: Nov. 17, 1992

[30] Foreign Application Priority Data

Nov. 22, 1991 [JP] Japan .................. 3-334022
Mar. 25, 1992 [JP] Japan .................. 4-098709

[51] Int. Cl.$^5$ .................. G02F 1/135; G03G 15/8
[52] U.S. Cl. .................. 359/72; 430/95
[58] Field of Search .................. 359/72; 430/95

[56] References Cited

U.S. PATENT DOCUMENTS

| 4,289,822 | 9/1981 | Shimada et al. | 428/212 |
| 4,925,276 | 5/1990 | Mc Murray, Jr. et al. | 359/72 |
| 5,056,897 | 10/1991 | Akiyama et al. | 359/72 |
| 5,182,624 | 1/1993 | Tran et al. | 257/292 |
| 5,231,282 | 7/1993 | Nishi et al. | 359/72 |
| 5,233,450 | 8/1993 | Hatano et al. | 359/72 |
| 5,235,195 | 8/1993 | Tran et al. | 257/291 |
| 5,262,262 | 11/1993 | Yagi et al. | 430/66 |
| 5,272,554 | 12/1993 | Ji et al. | 359/72 |
| 5,273,910 | 12/1993 | Tran et al. | 437/3 |

FOREIGN PATENT DOCUMENTS 58-199327 11/1983 Japan .
58-215626 12/1983 Japan .
62-242919 10/1987 Japan .
62-057016 11/1987 Japan .
2-083534 3/1990 Japan .
2-140723 5/1990 Japan .
2-154229 6/1990 Japan .
2-256026 10/1990 Japan .
2-262613 10/1990 Japan .

OTHER PUBLICATIONS

Ashley et al, "Amorphous Silicon Photoconductor in a Liquid Crystal Spatial Light Modulator", Applied Optics, vol.., 26 No. 2 (Jan. 1987), pp. 241–246.
Preprint for the 51st Meeting (1990) of the Japan Society of Applied Physics. p. 743, a Paper 29a–MF–2 is introduced by Hatano et al.
Preprint for the 17th Liquid Crystal Panel Discussion (1991) Under the Joint Auspices of the Japan Society of Applied Physics the Society of Polymer Science, Japan, and the Chemical Society of Japan, a Paper 4F108 is Introduced.

Primary Examiner—Anita P. Gross
Attorney, Agent, or Firm—Michael N. Meller

[57] ABSTRACT

A spatial light modulator capable of providing high contrast ratio and resolution moving pictures without an after-image effect is disclosed. The spatial light modulator comprises a pair of transparent electrodes for forming a driving electric field therebetween, and at least one photo-modulation member and a photoconductive member laminated between the pair of transparent electrodes, where the photoconductive member comprises a hydrogenated amorphous silicon film having thickness of 10 $\mu$m to 30 $\mu$m, and is doped with boron as such that an amount of the boron in the hydrogenated amorphous silicon film in atomic ratio with respect to silicon therein is 0.1 ppm to 1 ppm.

2 Claims, 5 Drawing Sheets

SPATIAL LIGHT MODULATOR WITH PHOTOCONDUCTOR OF HYDROGENATED AMORPHOUS SILICON WITH 0.1–1.0 PPM BORON

BACKGROUND OF THE INVENTION

1. Field of the Invention

The present invention relates to a spatial light modulator which comprises a photoconductive member and a photo-modulation member and is adapted to be used in an optical information processing device for parallel processing of moving images or still images or for displaying or storing thereof and, particularly, to an improvement thereof of the photoconductive member of the spatial light modulator.

2. Description of the Related Art

As an example of a spatial light modulator to be used in image processing, a liquid crystal light-valve element is disclosed in Japanese Patent Laid-Open No. 58-199327(1983). The purpose of the liquid crystal light-valve element in this patent application is to obtain a high resistance, high sensitivity photoconductive member, and the liquid crystal light-valve is composed of an amorphous silicon layer, a light-blocking layer and a liquid crystal layer arranged in the order. The amorphous silicon layer corresponding to the photoconductive member is doped with boron at any density selected from a range from 10 ppm to 400 ppm considering a variation of the Fermi level thereof.

In such a conventional technique, however, an application of drive voltage to the liquid crystal layer tends to be delayed since response speed of the amorphous silicon layer itself to light is not always high enough.

Therefore, although the above mentioned conventional light-valve may be used in a defect test device as described, it can not guarantee high image quality for a display of a moving image due to the so-called after-image problem.

SUMMARY OF THE INVENTION

The present invention was made in view of the above mentioned defects of the prior art and has an object to provide a spatial light modulator capable of displaying a high quality image with high contrast ratio and resolution without having an after-image problem for a moving picture.

In order to achieve the above object, a spatial light modulator according to an embodiment of the present invention, comprises a pair of transparent electrodes for forming a driving electric field therebetween and at least one photoconductive member and a photo-modulation member laminated between the transparent electrodes, where the photoconductive member comprises a hydrogenated amorphous silicon film having a thickness of 10 μm to 30 μm, and is doped with boron as such that an amount of the boron in the hydrogenated amorphous silicon film in atomic ratio with respect to silicon therein is 0.1 ppm to 1 ppm.

This enables the spatial light modulator according to the present invention capable of operating under elevated environmental temperature ranged 30° to 70° C. still maintaining required characteristics of sensitivity, response time, an after-image characteristic in particular, and resolution, for a moving picture display. In other words, when the spatial light modulator of the present invention is in practical use, its response time to the light, the fall time in particular, can be substantially improved with less sensitivity degradation by purposely increasing the temperature of the spatial light modulator.

DETAILED DESCRIPTION OF THE PREFERRED EMBODIMENTS

Embodiments of spatial light modulator according to the present invention will be described with reference to the accompanying drawings.

[Embodiment 1]

Figure 1:
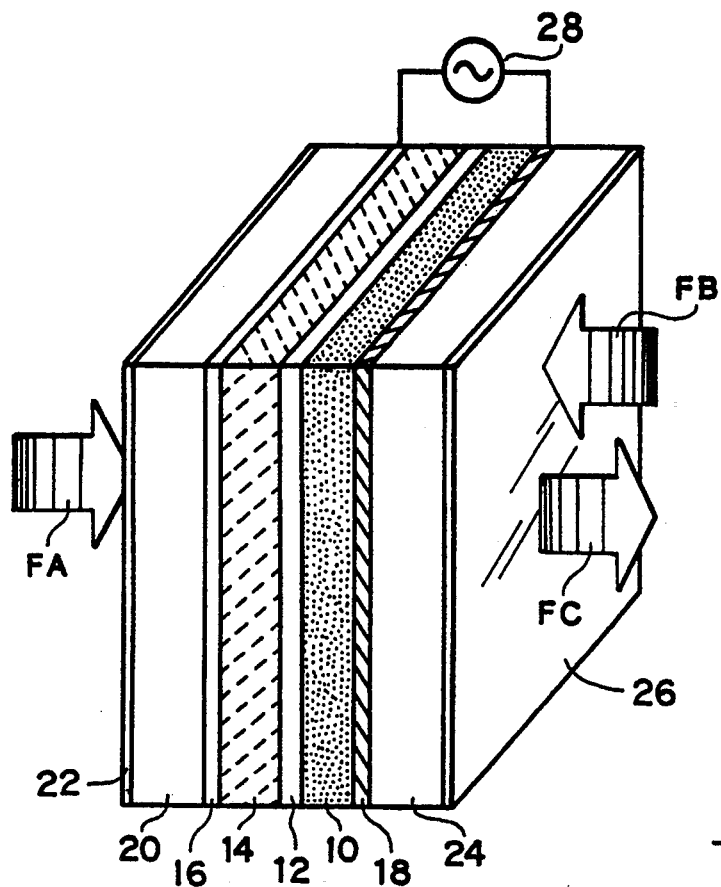
FIG. 1 is a construction of a spatial light modulator according to an embodiment of the present invention.

A first embodiment will be described with reference to FIGS. 1 to 6. In FIG. 1 which schematically shows a construction of a spatial light modulator according to the first embodiment of the present invention, a liquid crystal photo-modulation member 10, a dielectric mirror layer 12 and a photoconductive member 14 are laminated in the order to form a sub-lamination and the sub-lamination is sandwiched between transparent electrodes 16 and 18 to form a lamination.

The lamination is further sandwiched between glass substrates 20 and 24 optionally covered by respective anti-reflection films 22 and 26. Writing light is adapted to be directed to the glass substrate 20 and reading light is directed to the glass substrate 24.

The photo-modulation member 10 is of an "n" type nematic liquid crystal having DAP (Deformation of vertical Aligned Phases) characteristics exhibiting birefringence varying according to distribution of field strength applied. A driving voltage is adapted to be applied between the transparent electrodes 16 and 18 by an AC power source 28. The dielectric mirror layer 12 is formed from a lamination of a titanium dioxide ($TiO_2$) film and a silicon dioxide ($SiO_2$) film or a lamination of a silicon (Si) film and a $SiO_2$ film, etc. The transparent electrodes 16 and 18 are formed of, for example, ITO (Indium Tin Oxide) or stannic oxide ($SnO_2$), respectively.

The photoconductive member 14 of this embodiment is formed from a hydrogenated amorphous silicon (a-Si:H) film 10 to 30 μm thick, as will be described in detail below. The photoconductive member 14 of hydrogenated amorphous silicon is formed by, for example, plasma CVD. In the hydrogenated amorphous silicon film, a degree of the doped boron (B) impurity with respect to the silicon in the film is 0.1 ppm to 1 ppm in atomic ratio.

In operation, an AC voltage applied between the transparent electrodes 16 and 18 of the spatial light modulator constructed as mentioned above from the AC power source 28 connected there between. The applied driving voltage is distributed to the photo-modulation member 10, the dielectric mirror layer 12 and the photoconductive member 14, respectively, in a ratio corresponding to respective impedances of these elements. A writing light containing image information directed to the spatial light modulator as shown by an arrow FA under this condition passes through the anti-reflection film 22, the glass substrate 20 and the transparent electrode 16 to the photoconductive member 14, so that the impedance of the photoconductive member 14 is reduced. With the reduced impedance of the photoconductive member 14, voltages applied to the respective photo-modulation member 10 and the dielectric mirror layer 12 are increased.

Since the photo-modulation member 10 is formed of "n" type nematic liquid crystal, there is birefringence occurred in the photo-modulation member 10 with change of the driving voltage applied thereto. Therefore, transmittance of the photo-modulation member 10 is changed according to the intensity of writing light incident on the photoconductive member 14, that is, according to the image information.

On the other hand, a reading light directed to the anti-reflection film 26 as shown by an arrow FB passes through the film 26, the glass substrate 24 and the transparent electrode 18 to the photo-modulation member 10 in which reading light is modulated by the birefringence effect occurred therein. The reading light passed through the photo-modulation member 10 is reflected back by the dielectric mirror layer 12 as shown by an arrow FC, so that the image information is read out. The photoconductive member 14 responds to the writing light as an impedance change. In order to realize such impedance change of the photoconductive member 14 responsive to the writing light, a wavelength of the writing light should be selected suitably. On the other hand, the reading light may have the same wavelength as that of the writing light. However, it may be any other wavelength than that of the writing light so long as it can be modulated by the photo-modulation member 10.

The photoconductive member 14 of this embodiment will be described in detail with reference to FIGS. 2 to 6. The sensitivity of the spatial light modulator to the writing light depends upon its impedance change response of the photoconductive member 14, that is, a ratio of impedance of the photoconductive member 14 being illuminated with light to that without being illuminated, gradient of an applied voltage-transmittance curve of the photo-modulation member 10 (referred to as "γ") and an impedance matching between the respective layers. Therefore, the higher the sensitivity of hydrogenated amorphous silicon forming the photoconductive member 14 is the larger the contrast ratio of an image and the higher the impedance change response speed of hydrogenated amorphous silicon to light is the more advantageous for a moving picture display.

Figure 2:
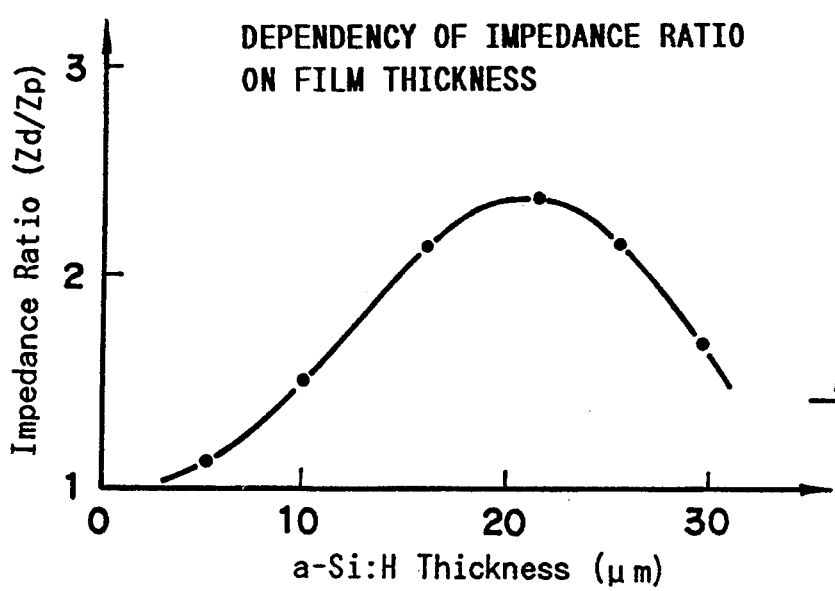
FIG. 2 is a graph showing a dependency of impedance ratio on film thickness of a photoconductive member of the spatial light modulator in FIG. 1.

FIG. 2 is a graph showing a dependency of impedance ratio Zd/Zp on the thickness of a hydrogenated amorphous silicon sample measured under conditions of doping amount of boron to silicon in the hydrogenated amorphous silicon sample of 0.5 ppm in atomic ratio, and of a wavelength and an intensity of light from a measuring light source of 700 nm and 10 $\mu W/cm^2$ respectively, and a frequency of the driving power source 28 of 1 kHz, where Zd is an impedance of the photoconductive member 14 being not irradiated by light and Zp is an impedance of the photoconductive member 14 being irradiated by light. As shown in FIG. 2, with the film thickness of 10 $\mu m$, the impedance change is about 1/1.5 times, and with 20 $\mu m$, about 1/2.4 times. Therefore, it is clear that the impedance ratio which corresponds to the sensitivity of the hydrogenated amorphous silicon increases with an increase of the film thickness up to about 20 $\mu m$, then gradually decreases as the film thickness further increases to 30 $\mu m$.

Figure 3:
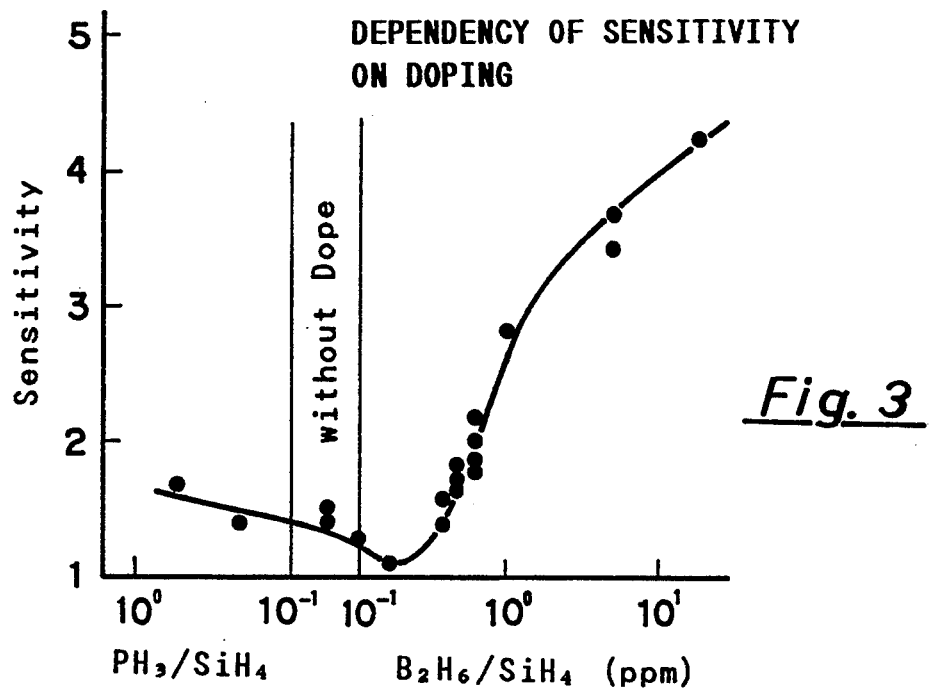
FIG. 3 is a graph showing a dependency of sensitivity on dopant amount in the photoconductive member.

FIG. 3 is a graph showing a dependency of sensitivity on the boron dopant amount of a hydrogenated amorphous silicon sample measured under the same conditions of the light source and the driving voltage frequency as those used for the measurement of the dependency of sensitivity on the thickness. Thickness of the sample was 15 to 18 $\mu m$. In this graph, abscissa is scaled in logarithm. It is clear from FIG. 3 that the sensitivity of hydrogenated amorphous silicon increases with increase of concentration of $B_2H_6$ gas, that is, doping amount of boron.

Figure 4:
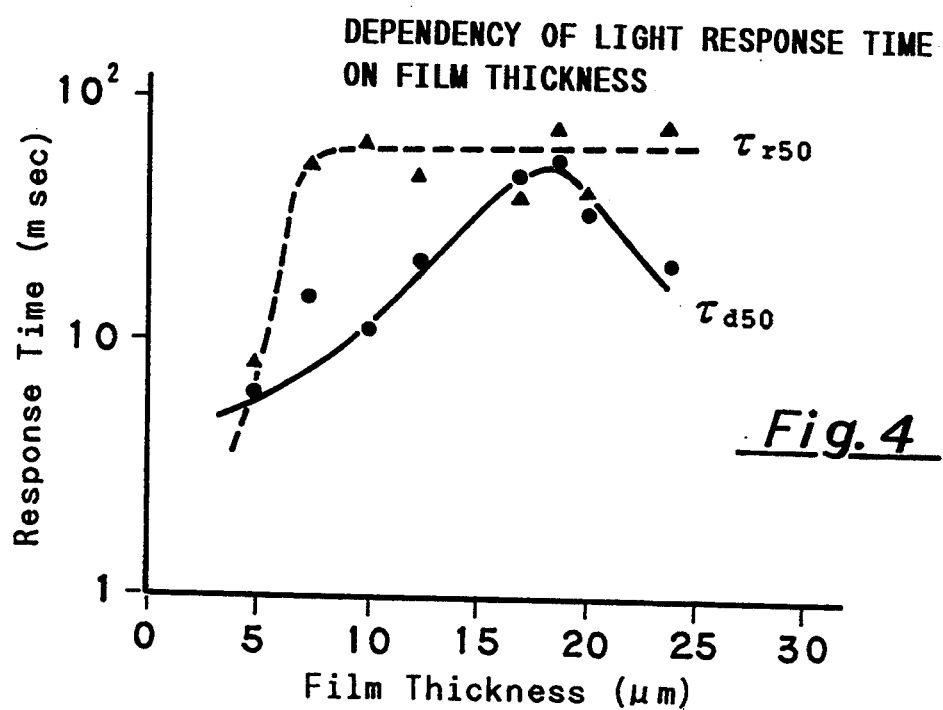
FIG. 4 is a graph showing a dependency of light response time on film thickness of the photoconductive member.

FIG. 4 is a graph showing a dependency of light response time on the film thickness of a hydrogenated amorphous silicon sample measured under the same conditions as those used in the dependency of sensitivity on the thickness. In FIG. 4, $\tau_{r50}$ and $\tau_{d50}$ are required time for the total impedance rising from 0 to 50% and falling from 100% to 50% respectively. In the graph shown in FIG. 4, ordinate is scaled in logarithm. It is clear from FIG. 4 that the rise time is relatively large for the film having thickness of about 6 $\mu m$ or more and decreases sharply for a smaller thickness than about 6 $\mu m$ and that the fall time $\tau_{d50}$ increases substantially proportional to the film thickness up to 18 $\mu m$ and decreases for a thicker film.

Figure 5:
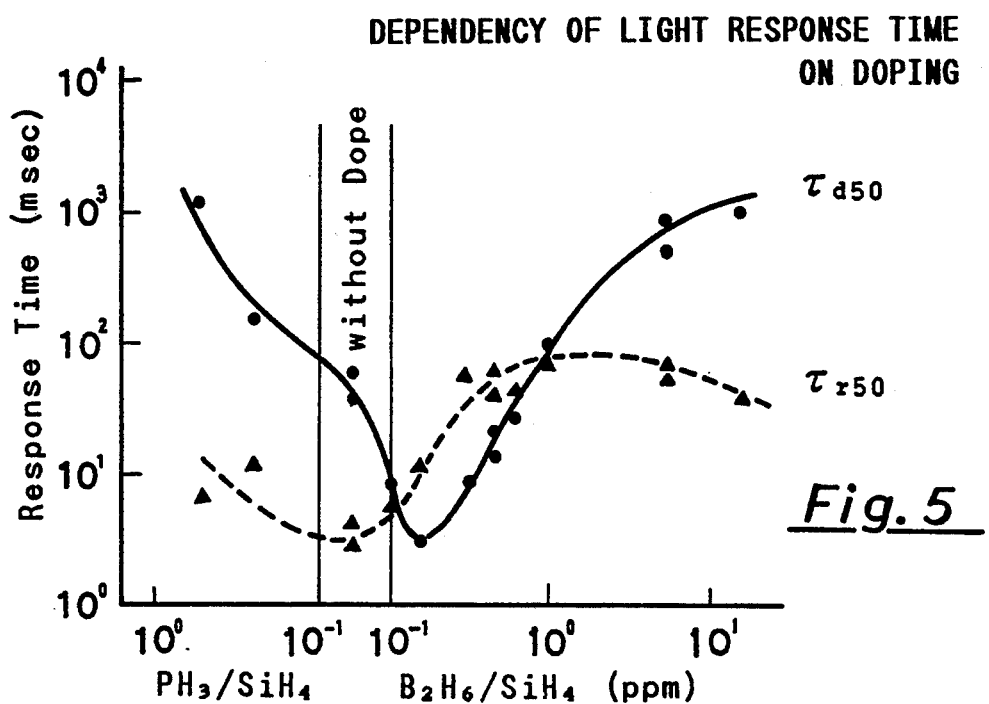
FIG. 5 is a graph showing a dependency of light response time on dopant amount in the photoconductive member.

FIG. 5 is a graph showing a dependency of light response time on the doping of a hydrogenated amorphous silicon sample measured under the same conditions as those used in FIG. 3. In FIG. 5, the graph is shown in logarithmic coordinates. It is clear from FIG. 5 that both the rise time $\tau_{r50}$ and the fall time $\tau_{d50}$ increase with the increase of doping amount of boron up to 1 ppm, and the rise time $\tau_{r50}$ then decreases in the range over 1 ppm of boron doping. Particularly, the change of the fall time $\tau_{d50}$ is conspicuous.

Figure 6:
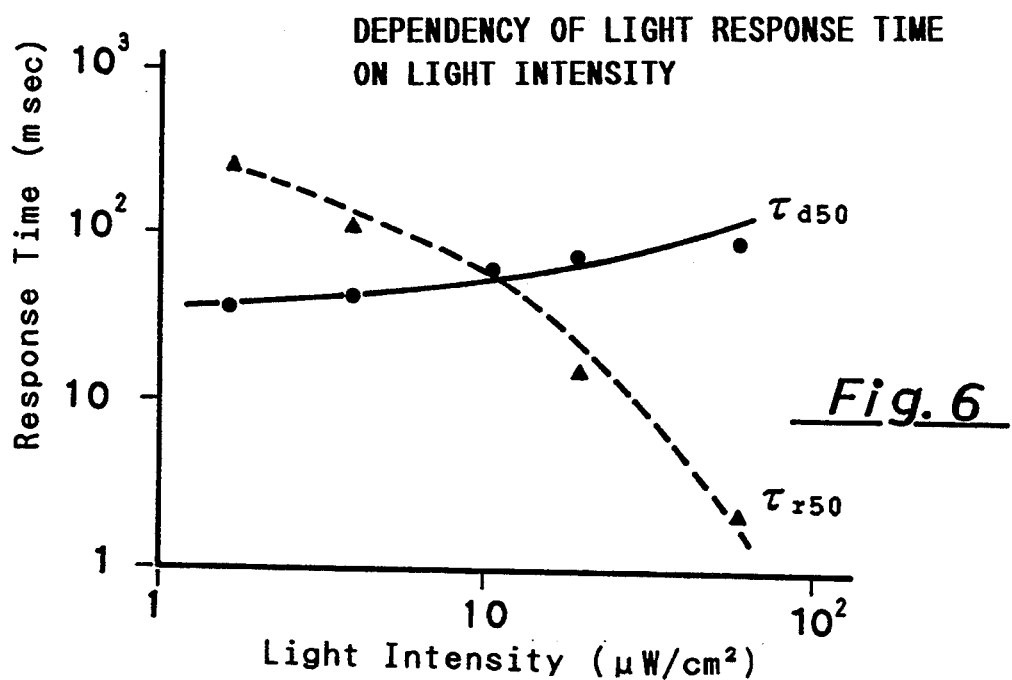
FIG. 6 is a graph showing a dependency of response time on light intensity on the photoconductive member.

FIG. 6 is a graph showing a dependency of light response time on the light intensity measured under the same conditions as those used in FIG. 2. The graph is shown in logarithmic coordinates. It is clear from FIG. 6 that the rise time $\tau_{r50}$ decreases substantially as the light intensity increases and the fall time $\tau_{d50}$ increases gradually with an increase of the light intensity.

Figure 7A:
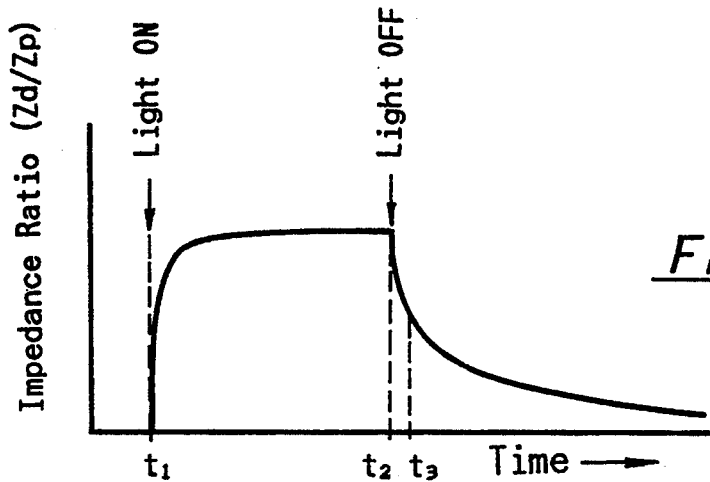
FIGS. 7(A) and 7(B) are graphs showing an impedance ratio of the photoconductive member responsive to an irradiated light.
Figure 7B:
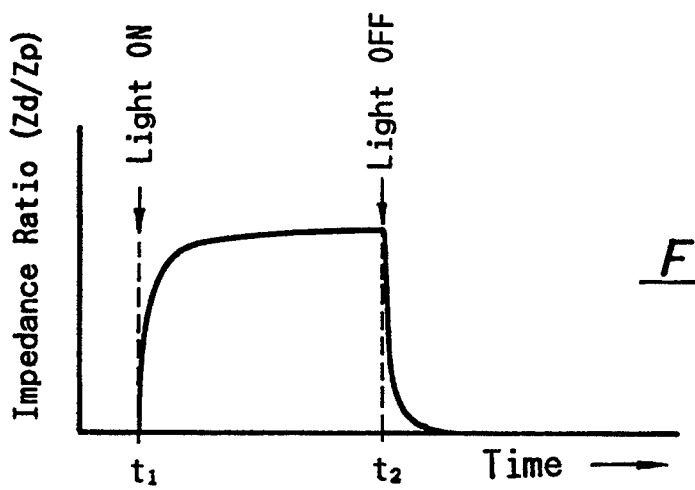

FIG. 7 is a graph showing rise and fall characteristics of the impedance ratio of the photoconductive member in response to ON and OFF of irradiating light, of which FIG. 7(A) is when boron is not doped, and FIG. 7(B) is when 0.15 ppm of boron is doped, the x-axis represents a time progress and the y-axis represents an impedance ratio which corresponds to the sensitivity. In FIG. 7(A), upon the light is incident (ON) at a time $t_1$ to the photoconductive member 14 with no boron doping, its impedance ratio rises quickly, and upon the light is made OFF at a time $t_2$, its impedance ratio falls quickly to an approximately 60% level at a time $t_3$, thereafter it decreases gradually presenting an afterimage phenomenon. On the other hand, in FIG. 7(B) of which boron is doped 0.15 ppm, the rise of the impedance ratio is roughly same as that in FIG. 7(A), but the fall is quick to a substantially low level so that no afterimage is present.

From FIGS. 2 to 6, it can be said as a general tendency that, when the doping amount of boron and/or the film thickness is increased, the sensitivity of hydrogenated amorphous silicon increases to the extent of the film thickness of up to approximately 20 μm and of the doping amount of up to 1 ppm, whereas the response time is degraded to increase. That is, the sensitivity and response time of the photoconductive member 14 are in a trade-off relation. As to the rise time, however, it is possible to reduce it by increasing light intensity as shown in FIG. 6. Therefore, if the relation between the fall time $\tau_{d50}$ and the sensitivity can be made optimum by controlling the amount of boron dopant and the film thickness, it may be possible to display a moving picture with a high contrast ratio.

From the foregoing, an optimum thickness range of the film is considered to be from 10 μm to 30 μm. On the other hand, as shown in FIG. 5, even if the film thickness is large, it is possible to reduce the fall time $\tau_{d50}$ to a practically acceptable small value with atomic ratio of the boron dopant of 0.1 ppm to 1 ppm. In summary, according to the present invention, the thickness of a hydrogenated amorphous silicon film constituting the photoconductive member 14 is determined in the range from 10 μm to 30 μm and the amount of boron dopant is determined to a value of 0.1 ppm to 1 ppm.

A spatial light modulator according to an embodiment of the present invention will now be described with reference to FIG. 1.

A photoconductive member 14 of hydrogenated amorphous silicon doped with boron was grown to a thickness of 16 μm on a glass substrate 20 having a transparent electrode 16 laminated thereto by a plasma CVD under conditions of substrate temperature of 200° C. and the gas pressure of 133 Pa. The gas was a mixture of silane gas ($SiH_4$) and hydrogen gas ($H_2$) in flow rate ratio of 15 sccm:60 sccm (standard cubic centimeter per minute), and a flow rate ratio (corresponding to its atomic ratio in the formed film) of $B_2H_6$ gas with respect to the silane gas was 1 ppm or less, that is, flow rate ratio of $B_2H_6$ gas was $1 \times 10^{-6}$ sccm to silane gas of 1 sccm. In this embodiment, the flow rate ratio of $B_2H_6$ gas with respect to the silane gas was 0.4 ppm so that atomic ratio of boron to silicon of hydrogenated amorphous silicon becomes 0.4 ppm.

In this case, a hydrogen content of the hydrogenated amorphous silicon was about 10 to 20 atm %. The dielectric mirror layer 12 was vapor-deposited on the photoconductive member 14. The dielectric mirror layer 12 was a 13-layer structure laminated alternatively with silicon and silicon dioxide layers.

On the other hand, a silicon dioxide layer was formed by angled evaporation on the glass substrate 24 having the transparent electrode 18 laminated thereto, on which a silane coupling agent (for example, AY43-0211 available from Toray-Dow Corning Silicone, Inc.) was further formed.

The glass substrates 20 and 24 were assembled to a cell of 3 μm thick, which was filled with liquid crystal (for example, EN-38 available from Chisso Inc.).

An AC voltage having driving frequency of 5 kHz was applied to the spatial light modulator thus constructed from the driving power source 28 and an image was written therein with a writing light having a wavelength of 700 nm. By using a reading light, an image having contrast ratio of 100:1 or more and resolution of 7 μm (70 lines/mm) was reproduced. The response time of this spatial light modulator was such that the rise time of which the reading light intensity changes from 0% to 90%, was 45 mili-seconds (ms) and the fall time of which the reading light intensity changes from 100% to 10%, was 35 ms. Such values were readily acceptable and it was confirmed that the spatial light modulator is well suited for a moving picture display.

As mentioned before, according to the present invention, a moving picture display at video signal rate is possible while maintaining high contrast and high resolution of the picture. Further, since, in this embodiment, the thickness of the photoconductive member 14 of the hydrogenated amorphous silicon is 10 to 30 μm, its sensitivity becomes maximum in a wavelength range 650 to 750 nm of the writing light. Therefore, a laser diode or an LED can be used as a source of the writing light, resulting in minimization of a device in which the spatial light modulator is to be incorporated.

In the first embodiment described above, the doped amount of boron in the hydrogenated amorphous silicon is described as 1 ppm in atomic ratio, whereas in the Japanese Patent Application No. H3-334022/1991 of which a priority is claimed for the present application, it is described as 1 ppm in weight content. This difference in expression is due to the fact that, in general, atomic ratio of doped impurity (boron in this embodiment) to the hydrogenated amorphous silicon is substantially equal to the ratio of gas flow rate. Further, during the course of the present invention, it has been learned and confirmed that the spatial light modulator using a photoconductive member doped with boron ranging from 0.1 ppm to 1 ppm, is adequately operable as a whole spatial light modulator unit, at an elevated ambient temperature higher than the room temperature.

[Second Embodiment]

A second embodiment of the present invention will be described with reference to FIGS. 8 and 9.

The construction of the spatial light modulator itself in the second embodiment is the same as that described with respect to the first embodiment except that the amount of boron doping is 1 ppm and the film thickness is 17 μm.

Figure 8:
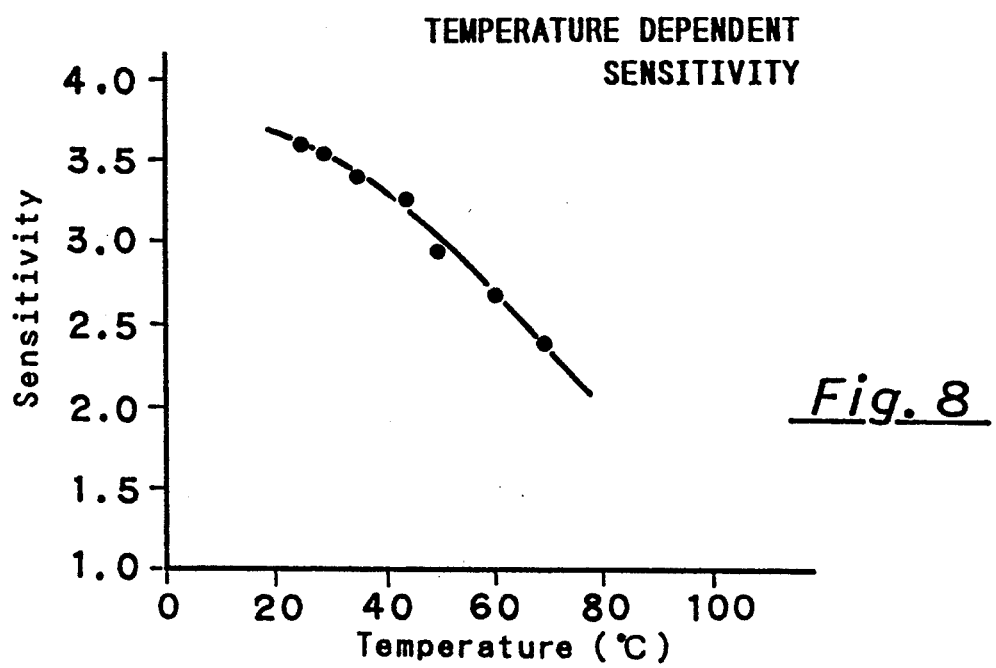
FIG. 8 is a graph showing a temperature dependent sensitivity of the photoconductive member.

FIG. 8 is a graph showing a dependency of sensitivity on the temperature of hydrogenated amorphous silicon, that is, ratio of impedance change thereof before irradiation with light to that after irradiated. An amount of boron dopant with respect to a hydrogenated amorphous silicon film was 1 ppm in atomic ratio, the thickness of the film was 17 μm and the wavelength and intensity of the writing light source were 700 nm and 50 μW/cm$^2$, respectively. Frequency of the driving power source was 5 kHz. It is clear from FIG. 8 that sensitivity is lowered with the increase of temperature. In fact, sensitivity of 3.6 at room temperature of 25° C., was lowered gradually to 2.9 at 50° C.

Figure 9:
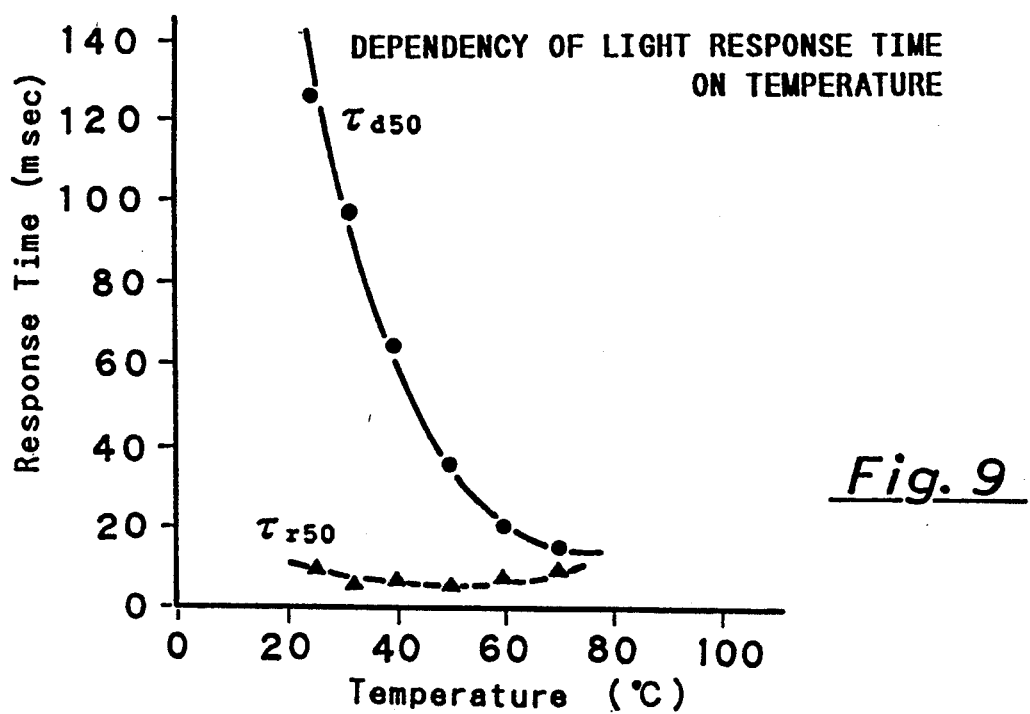
FIG. 9 is a graph showing a dependency of light response time on temperature of the photoconductive member.

FIG. 9 is a graph showing a dependency of light response time on the temperature of hydrogenated amorphous silicon. It is clear from FIG. 9 that, while the rise time $\tau_{r50}$ has no dependency on temperature and is 5 to 6 ms, the fall time is substantially reduced with the increase of temperature. For example, the fall time $\tau_{d50}$ of 126 ms at 25° C. was reduced to 33 ms at 50° C.

From the foregoing, it is clear that the response time of the photoconductive member, the fall time in particular, can be substantially improved to be short enough at the expense of less sensitivity degradation by purposely raising the ambient temperature of the spatial light modulator (the temperature within the image display device which houses the spatial light modulator).

Accordingly, it can be said from the facts shown in FIGS. 3, 5, 8 and 9, that the amount of dopant should be in a range from 0.1 ppm to 1 ppm in atomic ratio.

Next, the spatial light modulator prepared for the second embodiment will be described.

The photoconductive member 14 of hydrogenated amorphous silicon doped with boron, was grown to a thickness of 17 μm on the glass substrate 20 having the transparent electrode 16 preliminary laminated thereto, by plasma CVD under the conditions of temperature of the substrate of 200° C. and gas pressure of 133 Pa (1 Torr). The gas was a mixture of silane gas ($SiH_4$) and hydrogen gas ($H_2$) in a ratio of flow rate 15 sccm:60 sccm and $B_2H_6$ gas in a ratio of flow rate (corresponding to an atomic ratio) to the silane gas of 0.1 ppm to 1 ppm. In this embodiment, the flow rate ratio of $B_2H_6$ gas with respect to silane gas was 1 ppm so that atomic ratio of boron to silicon of hydrogenated amorphous silicon becomes 1 ppm.

In this case, the hydrogenated amorphous silicon contained hydrogen in an atomic ratio is about 10 to 20 atm %. The dielectric mirror layer 12 was vapor-deposited on the photoconductive member 14. The dielectric mirror layer 12 was a total of 19-layer structure in which 17 layers were formed by laminating alternately silicon (Si) and silicon dioxide ($SiO_2$) layers and another 2 layers were formed by laminating alternately titanium dioxide ($TiO_2$) and $SiO_2$ layers.

On the other hand, a silicon dioxide layer was formed by angled evaporation on the glass substrate 24 having the transparent electrode 18 laminated thereto, on which a silane coupling agent was formed.

The glass substrates 20 and 24 thus formed were assembled to a cell of 3 μm thick, which was filled with liquid crystal such as for example, MLC-2010 available from Merk Japan Corporation. This liquid crystal has a clearing point as high as about 92° C.

An AC voltage having driving frequency of 5 kHz was applied to the spatial light modulator thus constructed from the driving power source 28 and an image was written therein by using a writing light having a wavelength of 700 nm. By reading it using a reading light, an image having a contrast ratio of 100:1 was reproduced. The response time of this spatial light modulator was such that the rise time of which the reading light intensity changes from 0% to 90% was 100 ms and the fall time of which the reading light intensity changes from 100% to 10% was 60 ms at a room temperature.

When the ambient temperature of this spatial light modulator was increased to about 40° C., the rise time and the fall time were reduced to 40 ms and 30 ms, respectively, while maintaining the contrast ratio of 100:1. Such values were sufficiently acceptable and it was confirmed that the spatial light modulator was well suited for a moving picture display. As mentioned in the foregoing, according to the second embodiment of the present invention, it is possible to display a moving picture at video signal rate while maintaining high contrast and high resolution characteristics even when the temperature of the spatial light modulator is increased by heat generated by other parts mounted on the image display device.

[Other Embodiments]

The present invention is not limited to the above mentioned embodiments and the following embodiments are fallen within the scope of the present invention:

(1) A light blocking layer of CdTe, Si, Ge and/or B is provided between the dielectric mirror layer 12 and the photoconductive member 14.

(2) Instead of nematic liquid crystal used in the described embodiments as the photo-modulation member, other material such as polymer dispersed liquid crystal (PDLC) is used.

(3) The present invention can be applied to a still picture display, although it is well suited for a moving picture display.

(4) The same results as written in the foregoing specification is obtained when the hydrogenated amorphus silicon contains a small amount of one or more of other substances "C", "N", "O" where the total content of the other substance(s) is few percent.

(5) For moving picture reproduction at a rate of 30 frames per second, a preferable doping amount of boron is in the range of 0.1 ppm to 1 ppm.

According to the spatial light modulator of the present invention, the following advantages is obtained:

Since the photoconductive member is formed from a hydrogenated amorphous silicon film having thickness of 10 μm to 30 μm and doped with boron in atomic ratio thereof to silicon of the film of 0.1 ppm to 1 ppm, a good contrast ratio and resolution can be obtained for even a moving picture without an after-image effect.

What is claimed is:

1. A spatial light modulator having a pair of transparent electrodes for forming a driving electric field therebetween and at least one photoconductive member and a photo-modulation member laminated between said pair of transparent electrodes, wherein;

said photoconductive member comprises a hydrogenated amorphous silicon film having thickness of 10 μm to 30 μm; and said photoconductive member is doped with boron as such that an amount of the boron in said hydrogenated amorphous silicon film in atomic ratio with respect to silicon in said hydrogenated amorphous silicon film is above 0.1 ppm and less than 1 ppm.

2. A spatial light modulator as defined in claim 1, wherein the concentration of said boron in said hydrogenated amorphous silicon film in atomic ratio with respect to silicon is between 0.15 ppm and 0.5 ppm inclusive.

* * * * *